United States Patent

Lauster

[15] 3,683,065
[45] Aug. 8, 1972

[54] LIQUID DENTIFRICE

[72] Inventor: Frederick L. Lauster, Massillon, Ohio

[73] Assignee: Cameo, Inc., Toledo, Ohio

[22] Filed: Sept. 17, 1969

[21] Appl. No.: 858,854

[52] U.S. Cl. ................................424/57
[51] Int. Cl. ................................A61k 7/16
[58] Field of Search................424/49–58

[56] References Cited

UNITED STATES PATENTS

| | | | |
|---|---|---|---|
| 2,550,207 | 4/1951 | Tainter et al. | 424/49 |
| 2,744,049 | 5/1956 | Salzmann et al. | 424/49 |
| 3,060,098 | 10/1962 | Gershon | 424/52 |

FOREIGN PATENTS OR APPLICATIONS

| | | | |
|---|---|---|---|
| 1,559,196 | 1/1969 | France | 424/49 |

*Primary Examiner*—Richard L. Huff
*Attorney*—Roylance, Abrams, Berdo & Kaul

[57] ABSTRACT

A liquid dentifrice which cleans, whitens and restores the natural lustre of teeth and dentures, and contains ingredients which adsorb stains, food particles and bacteria, preventing their adherence to the enamel surfaces of natural or artificial teeth. It is characterized by the fact that it is in the form of a homogeneous solution and remains so over long periods, and contains a humectant in desired amounts, enabling the dentifrice to retain moisture when exposed to air, thereby preventing the dentifrice from hardening when so exposed.

1 Claim, No Drawings

LIQUID DENTIFRICE

This invention relates generally to a liquid dentifrice which, when used regularly, is highly effective for cleaning and polishing the teeth, without appreciable abrasion of the teeth.

A primary object of the invention is to provide a liquid dentifrice of the character described, which is characterized by the use of a cleaning agent which is highly adsorbent and is thus effective to gather on its surface foreign material, debris and bacteria, which normally accumulate on and between the teeth, enabling such material to be easily removed during cleaning of the teeth, leaving a glossy surface on the teeth.

Another object of the invention is to provide a liquid dentifrice of the character described, which is characterized by the fact that it is homogeneous or uniform in character, despite the fact that it consists of a relatively large number of ingredients of diverse physical characteristics and properties.

A further object of the invention is to provide a liquid dentifrice of the character described, which consists of a unique and highly efficient or desirable combination of cleaning agent, polishing agent, humectant, binder, and flavoring agent.

A still further object of the invention is to provide a unique and highly desirable method of mixing the aforesaid ingredients.

Other objects and advantages of the invention will appear in the course of the following description of the liquid dentifrice and method of compounding or making the same.

The liquid dentifrice, in accordance with the invention, consists of the following ingredients, in the proportion by weight indicated:

|  | Range | Preferred |
|---|---|---|
| Aluminum hydroxide (purified powder) | 25–38% | 30% |
| Dicalcium phosphate dihydrate | 7–13% | 10% |
| Liquid sorbitol solution (70% aqueous sorbitol) | 25–38% | 30% |
| Carboxymethylcellulose | 0.5–1.5% | 1% |
| Flavoring (essential oils) | 1–3% | 2% |
| Distilled Water | 15–35% | 27% |

The aluminum hydroxide is a cleaning agent which has high adsorption properties, rendering it effective to gather on its surface foreign material, debris, and bacteria, which normally accumulate on and between the teeth, enabling such material to be easily removed during cleaning of the teeth, leaving a glossy surface on the teeth.

Dicalcium phosphate dihydrate is a polishing agent, which is effective to impart a desired lustre to the teeth, as the result of continued use of the dentifrice. Moreover, its action is such that it polishes the teeth without appreciable abrasion thereof.

Liquid sorbitol solution is a 70 percent aqueous solution of sorbitol, which is available as a trademarked product, called "Sorbo." It acts as a humectant, enabling the dentifrice to retain moisture when the dentifrice is exposed to air, thereby preventing the dentifrice from hardening when so exposed.

Carboxymethylcellulose acts as a binder, to prevent separation of the liquid phase, particularly during storage, since the dentifrice is, in essence, a combination of solid and liquid phases. In other words, it stabilizes the mass against separation of the liquid phase.

The flavoring agent consists of one or more of the essential oils, which impart an acceptable and pleasing flavor to the dentifrice when used and leave a lasting pleasant after taste. These essential oils or flavors include menthol, oil of wintergreen, oil of peppermint and oil of spearmint.

The liquid dentifrice is compounded or made in the following manner:

The sorbitol and essential oils are heated until they are lukewarm, placed in a mixer bowl and agitated until they are thoroughly mixed. To this mixture are added the aluminum hydroxide powder, the dicalcium phosphate dihydrate powder, and carboxymethylcellulose, and mixing is resumed until a product of creamy consistency is obtained, after which the distilled water (previously heated to nearly boiling) is added, and agitation is resumed. The product is then strained to remove any possible foreign matter, and the strained fluid poured into bottles and permitted to cool.

This method of preparation ensures that the final product is entirely homogeneous or uniform in nature, prevents segregation of any of the constituents, and results in a product of desirable consistency, suitable and thoroughly effective as a liquid dentifrice.

The dentifrice, as thus made, is highly effective in removing stains from the teeth and restoring their original gleaming or pearlescent lustre, and retains its homogeneity for long periods, despite the fact that the constituents or ingredients have diverse physical characteristics or properties.

It is understood that slight changes may be made in the formula and method, as described herein, without departing from the spirit of the invention or the scope of the subjoined claims.

Having thus described my invention, I claim:

1. A method of making a liquid dentifrice consisting by weight of 25 to 38 percent aluminum hydroxide, 7 to 13 percent dicalcium phosphate dihydrate, 25 to 38 percent of a 70 percent aqueous solution of sorbitol, 0.5 to 1.5 percent carboxymethylcellulose, 1 to 3 percent of essential oils, and 15 to 35 percent water, wherein the sorbitol and essential oils are heated until lukewarm, placed in a receptacle and agitated until thoroughly mixed, the aluminum hydroxide, dicalcium phosphate dihydrate and carboxymethylcellulose are added to the mixture, and mixing is resumed until a product of creamy consistency is obtained, after which the water, heated to nearly boiling, is added, and agitation is resumed.

* * * * *